June 16, 1959 — A. M. MOEN — 2,890,719
MIXING VALVE CONSTRUCTION
Filed Oct. 1, 1956
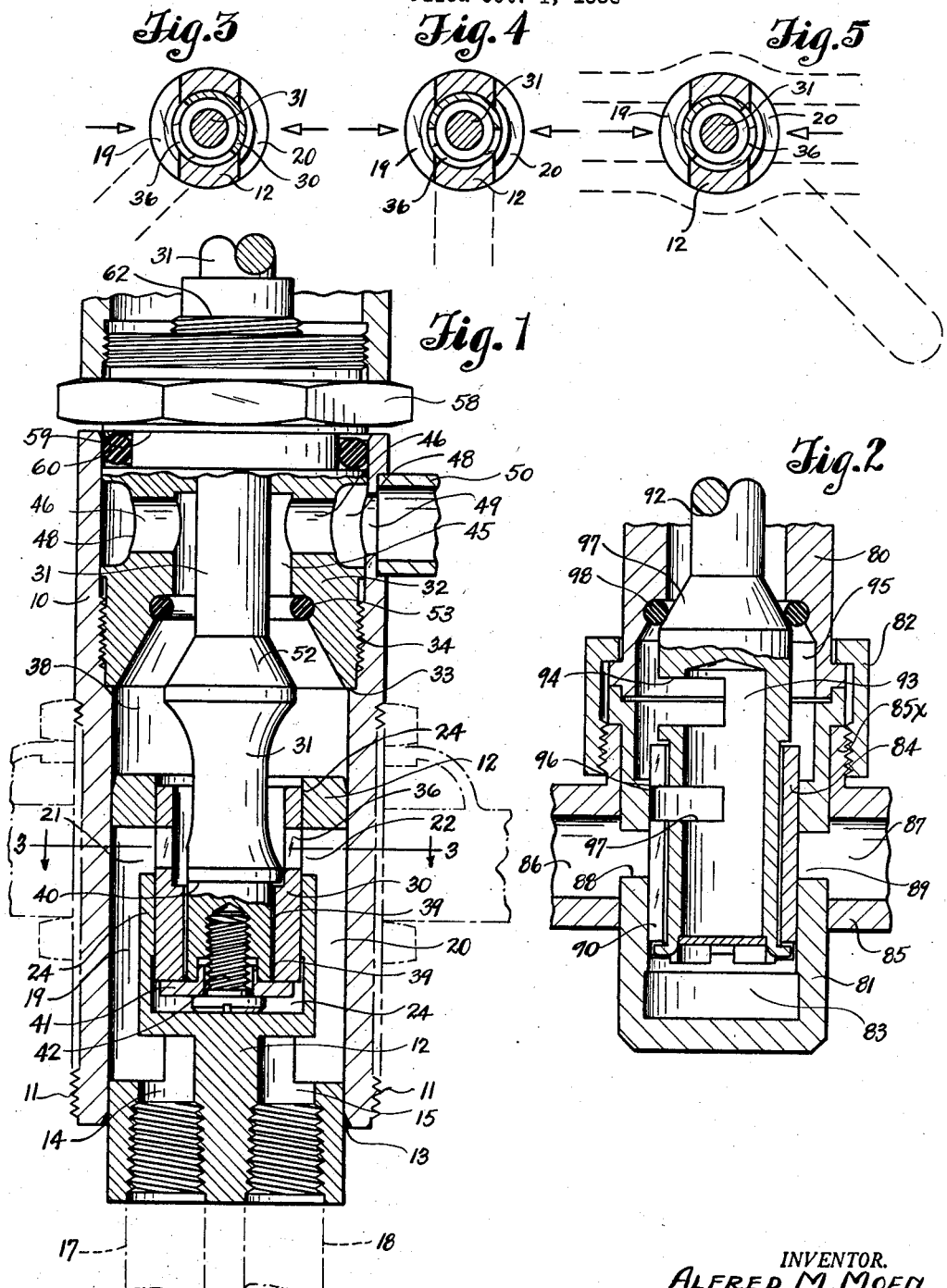
INVENTOR.
ALFRED M. MOEN
BY Robinson & Berry
ATTORNEYS

United States Patent Office 2,890,719
Patented June 16, 1959

2,890,719

MIXING VALVE CONSTRUCTION

Alfred M. Moen, Elyria, Ohio

Application October 1, 1956, Serial No. 613,030

1 Claim. (Cl. 137—636.2)

This invention relates to faucets and valves and has reference more particularly to a simplified valve structure that is especially desirable for those kinds or types of mixing faucets or valves where compactness and simplicity is desirable or essential.

It is the principal object of the present invention to provide a simplified housing and valve body structure that is more practical for certain types of installations than conventional types, and which possesses satisfactory efficiency in operation; ease both in assembly for use and in disassembly for servicing, and which is comparatively inexpensive to manufacture.

More specifically stated, it is the principal object of this invention to provide a valve structure that is characterized by the use of a tubular housing into the upper end of which a plug, carrying the movable valve member, its actuating stem and operating handle, is threaded, and within the lower end of which housing a plug is fitted and secured, and which plug is formed with a cylindrical valve chamber in which the valve operates and to which hot and cold water inlets, which enter through the lower end of the plug, lead.

It is a further object of the invention to provide a valve structure as above described, that can be easily and readily mounted in a sink top, ledge or other support, and which will present an attractive appearance.

Further objects of the invention reside in the details of construction and combination of parts embodied therein, and in their mode of operation, as will hereinafter be described.

In accomplishing the above mentioned and other objects of the invention, I have provided the improved details of construction, the preferred forms of which are illustrated in the accompanying drawings, wherein:

Fig. 1 is a cross-sectional view of a valve structure embodying the present improvements, taken in the axial plane of the tubular housing and valve.

Fig. 2 is a similar cross-sectional view of a valve structure of a modified form embodying a tubular housing.

Figs. 3, 4 and 5 are sectional views, taken horizontally through the valve member, as on line 3—3 in Fig. 1, showing the valve in positions for flow of all hot water; for a mixture of hot and cold water, and for all cold water, respectively.

Referring more in detail to the drawings and first to the valve structure of Fig. 1:

The valve housing comprises a single and rather elongated tubular member 10 which is exteriorly threaded, as at 11, from its lower end upwardly approximately for half its length; it being the intent that, for the mounting of the faucet in a sink top or the like, this lower threaded portion may be projected downwardly through an opening in the sink ledge and then secured in the usual way by clamp nuts threaded onto the piece as has been indicated in dotted lines.

Fitted within the lower end portion of the tubular housing 10, is a solid plug 12. This plug is of metal and is secured in position by welding, or the like, applied at the lower end of the housing, as at 13, and providing a water-tight joint. Directed upwardly into the lower end portion of the plug 12, in parallel relationship and at opposite sides of its axial line, are bores 14 and 15 which provide inlet channels for hot and cold water, respectively. The lower end portions of these bores are interiorly threaded, for the threaded connection of water supply pipes 17 and 18 with the plug. At their upper ends the bores 14 and 15 have lateral openings directed into the lower ends of elongated recesses or channels 19 and 20 formed in and upwardly along the opposite sides of the plug, and which, at their upper ends lead inwardly, through passages 21 and 22, into the upper end portion of a valve cylinder 24 which is bored axially into the plug, downwardly from its upper end. The passages 21 and 22 are directed circumferentially of the valve cylinder and, as noted in Figs. 3, 4 and 5, each extends along the cylinder wall through an arc of about 80°.

Reciprocally and rotatably fitted in the valve cylinder 24 is a tubular valve member 30; this being fixed to the lower end of a valve stem 31 for its adjustment. This stem is mounted for rotation and also for longitudinal adjustment in a solid plug 32 that is removably contained in the upper end portion of the tubular housing 10. It is to be observed that, at its lower end, the plug 32 seats in a water-tight joint against an annular, upwardly facing shoulder 33 formed in the housing 10; the plug being threaded along its lower end portion, as at 34, for drawing it tight and for securing it in functional position.

The movable valve member 30 is formed, through the upper end portion of a sidewall, with a water inlet passage 36, that extends circumferentially of the member through an arc of 180°. By an up and down movement of this valve member, the passage 36 can be registered to more or less extent, with one or both of the inlet passages 21 and 22, and then by rotative adjustment can be caused to vary the proportionate amounts of hot and cold water admitted between all cold and all hot water.

The upper end portion of the tubular valve member 30 is of greater diameter than the valve actuating stem 31 which is contained therein, thus providing an annular passage for an upward discharge of water through the open valve, into a mixing chamber 38 that is defined between the adjacent ends of the plugs 12 and 32. The lower end of the valve stem 31 is operatively connected to the lower end portion of the valve by any suitable means. In the present instance the stem is shown as being extended through an axial bore 39 in the lower end wall of the valve and as having downwardly facing shoulders 40 that seat against the bored wall, and as having a button 41 locked by a screw bolt 42 flatly against the lower end of the valve member; the button having locked connections with both stem and valve so that the valve member moves up and down and rotates with the stem. This valve and stem connection herein illustrated is substantially like that described and claimed in my co-pending application filed under Serial No. 496,965 on March 28, 1955.

Formed in the lower end portion of the plug 32 is an upwardly directed bore 45 with radial outlets 46 at its upper end leading into an annular channel 48 formed in and about the plug body. At one point, the wall of the plug enclosing sleeve is formed with a port 49 opening into a spout 50 mounted in the housing. The lower end portion of bore 45 is conically flared, and opens to the mixing chamber 38. The valve stem 31 is formed above the valve, with an upwardly facing annular seat 52 of conical form that is adapted, when the valve is completely closed, to seat against a sealing gasket 53 of O-ring form held in a seat formed about the entrance to the cylindrical upper end portion of bore 45.

The plug 32 also is formed about its upper end portion with a wrench head 58 by which it can be tightened into the housing 10, and below this wrench head it is formed with an encircling channel 59 in which an O-ring sealing gasket 60 is contained; the sealing ring being received within the upper end portion of the housing 10 when the parts are properly assembled, and serves to prevent any leakage from the housing at that end.

The valve stem 31 extends upwardly from the plug 32 through a packing material, not shown, but held in the plug by a packing nut 62 through which the stem extends.

The means employed for adjusting the valve member is not herein shown but it is to be understood that it can be a handle of any suitable kind, for example, one like that of my U.S. patent issued under No. 2,609,206 on September 2, 1952, which provides for rotation and also longitudinal adjustments of the valve.

In the modified construction shown in Fig. 2, I also employ a tubular valve housing but in this assembly, it comprises upper and lower end sections 80 and 81 of the same outside diameters and joined end to end in a watertight joint by a union fitting 82.

The lower end section 81 of the housing has a cylindrical lower end chamber 83 in which a tubular valve sleeve 84 of uniform diameter is rotatably and longitudinally movable. This lower section of the housing is contained within a fitting 85 which has hot and cold water inlets 86 and 87 directly communicating, respectively, with water inlets 88 and 89 formed in opposite sidewalls of the housing section 81. The union fitting 82 which clamps the two sections 80, 81 of the housing in end to end connection, threads onto an upwardly directed neck 85x of the fitting 85, and thus secures the tubular housing within the fitting.

A feature of this particular valve member 84 resides in the fact that it is longitudinally split, as at 90, and is applied in its cylinder 83 while under slight compression so that its natural tendency to expand causes it to maintain a close fit within the cylinder regardless of wear.

A valve stem 92 extends coaxially into the tubular housing as formed by the joined sections 80 and 81. It is fixed at its lower end within the valve sleeve 84, and this lower end portion of the stem is tubular, thus providing a chamber 93 therein which, at a location above the valve member 84 is formed with a lateral outlet 94 opening into a diametrically enlarged chamber 95 formed in the housing above the cylindrical chamber 83 in which the valve 84 operates.

The valve sleeve 84 is formed in a sidewall with a circumferentially directed inlet 96 that registers with a similar inlet 97 in the lower tubular portion of the stem. Thus, when the valve 84 is moved into registration with either or both of the housing inlets 88, 89, water will be admitted to the tubular stem, to flow therefrom into chamber 95. From chamber 95 the flow is upwardly about the stem to an outlet, not shown, which might correspond to the outlet 49 as seen in the device of Fig. 1, or any other suitable outlet, or spout associated with part 80.

It is to be observed that the split 90 in the valve member 84 is at that side of the valve in which the inlet 96 is formed. Therefore, when the valve is turned to a neutral closed position, there will be no leakage through this split joint. When the valve is open, leakage is of no consequence. Furthermore, the valve stem is formed with an upwardly facing conical shoulder 97 adapted to close against an O-ring sealing gasket 98 at the entrance to the outlet from chamber 95, to prevent leakage from the faucet when the valve stem seat 97 is closed against the gasket 98.

What I claim is:

A valve structure of the character described comprising a one-piece tubular housing, a plug-like body fitted and permanently sealed in the lower end portion of said housing, a stem mounting plug removably fitted in and sealing the upper end of said housing thus providing a mixing chamber in said housing between the stem mounting plug and said plug-like body, said plug-like body comprising a substantially cylindrically shaped member having upper and lower portions and connecting web portions of substantially the same diameter as the interior diameter of the housing, the plug-like body having opposed recesses between the connecting web portions thus forming at least two water tight compartments with the housing and serving as inlet chambers, the lower portion of the plug-like body having means for connecting supply pipes thereto and communicating with the chambers, the plug-like body having an upwardly opening coaxial bore extending downwardly toward and terminating short of the lower end of the plug-like body and having ports in the upper part thereof communicating with the inlet chambers, a rotatable and longitudinally shiftable valve member within the coaxial bore which when shifted opens the ports to allow flow from the inlet chambers to the mixing chamber, said stem mounting plug having a discharge passage leading upwardly therein from its lower end, said tubular housing having a discharge port formed therethrough in communication with said discharge passage, and a valve stem extending axially through said stem mounting plug and operatively connected at its inner end with said valve means for its control.

References Cited in the file of this patent

UNITED STATES PATENTS

| | | |
|---|---|---|
| 1,945,645 | Kumpman | Feb. 6, 1934 |
| 2,204,257 | Powers | June 11, 1940 |
| 2,644,483 | Parker | July 7, 1953 |
| 2,766,774 | Mornard | Oct. 16, 1956 |